(12) United States Patent
Shu et al.

(10) Patent No.: US 7,911,095 B2
(45) Date of Patent: Mar. 22, 2011

(54) SERVO MOTOR WITH LARGE ROTOR INERTIA

(75) Inventors: Hong-Cheng Shu, Taoyuan Hsien (TW); Chun-Hung Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 728 days.

(21) Appl. No.: 11/354,021

(22) Filed: Feb. 15, 2006

(65) Prior Publication Data
US 2007/0188031 A1    Aug. 16, 2007

(51) Int. Cl.
*H02K 7/02* (2006.01)
(52) U.S. Cl. ............................. 310/74; 310/91
(58) Field of Classification Search .............. 310/74, 310/89, 91, 254, 261, 44
See application file for complete search history.

(56) References Cited

U.S. PATENT DOCUMENTS

| | | | | |
|---|---|---|---|---|
| 4,363,984 A | * | 12/1982 | Torii et al. ............... | 310/156.12 |
| 4,386,307 A | * | 5/1983 | Webby ........................ | 318/705 |
| 4,589,707 A | * | 5/1986 | Caye et al. .................. | 310/90.5 |
| 4,753,116 A | * | 6/1988 | Burchett ..................... | 73/862.09 |
| 4,800,306 A | * | 1/1989 | Oberto ........................ | 310/51 |
| 5,124,605 A | * | 6/1992 | Bitterly et al. ............... | 310/74 |
| 5,723,923 A | * | 3/1998 | Clagett ........................ | 310/74 |
| 5,969,446 A | * | 10/1999 | Eisenhaure et al. ......... | 310/74 |
| 6,043,577 A | * | 3/2000 | Bornemann et al. ........ | 310/74 |

FOREIGN PATENT DOCUMENTS

| | | |
|---|---|---|
| CN | 2123136 U | 11/1992 |
| CN | 1536744 A | 10/2004 |
| CN | 1560982 A | 1/2005 |

OTHER PUBLICATIONS

Office Actions dated Oct. 10, 2008 and dated May 22, 2009 from China Patent Office.

* cited by examiner

*Primary Examiner* — Thanh Lam
(74) *Attorney, Agent, or Firm* — Chun-Ming Shih; HDLS IPR Services

(57) ABSTRACT

A servo motor with large rotor inertia includes a casing, a stator, a rotor and an inertial disk. The casing includes a hollow chamber and axial stages at front side and rear side thereof. The stator is arranged in the chamber and includes a ring and a plurality of coils around the ring. A through hole is defined at the center of the ring. A rotation shaft of the rotor is fixed to the stage and a magnet body is capped to the rotation shaft, where the magnet body is arranged in the through hole. The inertial disk is fixed to the rotation shaft of the rotor. The rotational inertia of the rotor is increased by rotating the inertial disk when the rotor is rotated by magnetize the stator. Therefore, the inertial disks of various sizes can be fixed to the rotor for matching different load inertia.

7 Claims, 6 Drawing Sheets

SERVO MOTOR WITH LARGE ROTOR INERTIA

BACKGROUND OF THE INVENTION

1. Field of the Invention

The present invention relates to a servo motor, especially to a servo motor with large rotor inertia.

2. Description of Prior Art

The major function of servo motor is to drive load and achieve a precise position for the load. The motor and load is generally connected by flexible link to couple the axes of motor and load. The flexible link uses the flexibility pro se to balance the strain and vibration cause by misalignment between motor and load. However, the motor and the load become a dynamic system of two degree of freedom. Therefore, the rotor inertia and the load inertia need good match to achieve good system controllability. The rotor inertia should be carefully chosen for the known load inertia to achieve optimal performance.

Moreover, the rotor inertia is proportional to rotor length and fourth power of rotor radius. There are two approaches for servo motor with the same cross section. The first approach increases rotor length as shown in FIGS. 1A and 1B. The motor comprises a casing 10a, a stator 11a fixed in the casing 10a, and a rotor 12a with both ends connected to front and rear sides of the casing 10a through bearings. The rotor 12a comprises magnetic body at center thereof and corresponding to inner end of silicon steel plates of the stator 11a. As shown in FIG. 1B, the rotor inertia is increased by increasing rotor length. However, the weight of the rotor 12a is increased too. The lifetime of bearing is reduced and the cost of magnetic body and silicon steel plate are increased because the length of the stator 11a is also increased.

Another approach is to increase the outer diameter of rotor. As shown in FIGS. 2A and 2B, the motor comprises a casing 20a, a stator 21a arranged in the casing 20a and a rotor 22a fixed to front and rear sides of the caseing 20a through bearing. The rotor 22a comprises magnetic body on center thereof and corresponding to inner side of the silicon steel of the stator 21a, where the outer diameter of the rotor 22a is increased to increase the inertia of rotor, as shown in FIG. 2B. Therefore the size of the silicon steel of the stator 21a needs increment and the mold for the silicon steel of the stator 21a also needs redesign. For a production line providing various rotor inertias, stator 21a with silicon steel of various sizes are required. The number of mold die for the stator 21a is also increased and the cost is also increased.

SUMMARY OF THE INVENTION

The present invention is to provide a servo motor with large rotor inertia, where inertia disks of various sizes are arranged on the rotor such that the motor with the same output power has different rotor inertias for load needing different inertia.

Accordingly, the present invention provides a servo motor with large rotor inertia, comprising:

a casing comprising a hollow chamber and axial stages at front side and rear side thereof;

a stator arranged in the chamber and comprising a ring and a plurality of coils around the ring, a through hole being defined at the center of the ring;

a rotor comprising a rotation shaft and a magnetic body capped to the rotation shaft, wherein both ends of the rotation shaft are fixed to the axial stages such that the magnetic body is arranged in the through hole; and an inertia disk fixed to the rotation shaft of the rotor, wherein the inertia disk is rotated to increase rotation inertia of the rotor when the stator is magnetized to rotate the rotor.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1A:
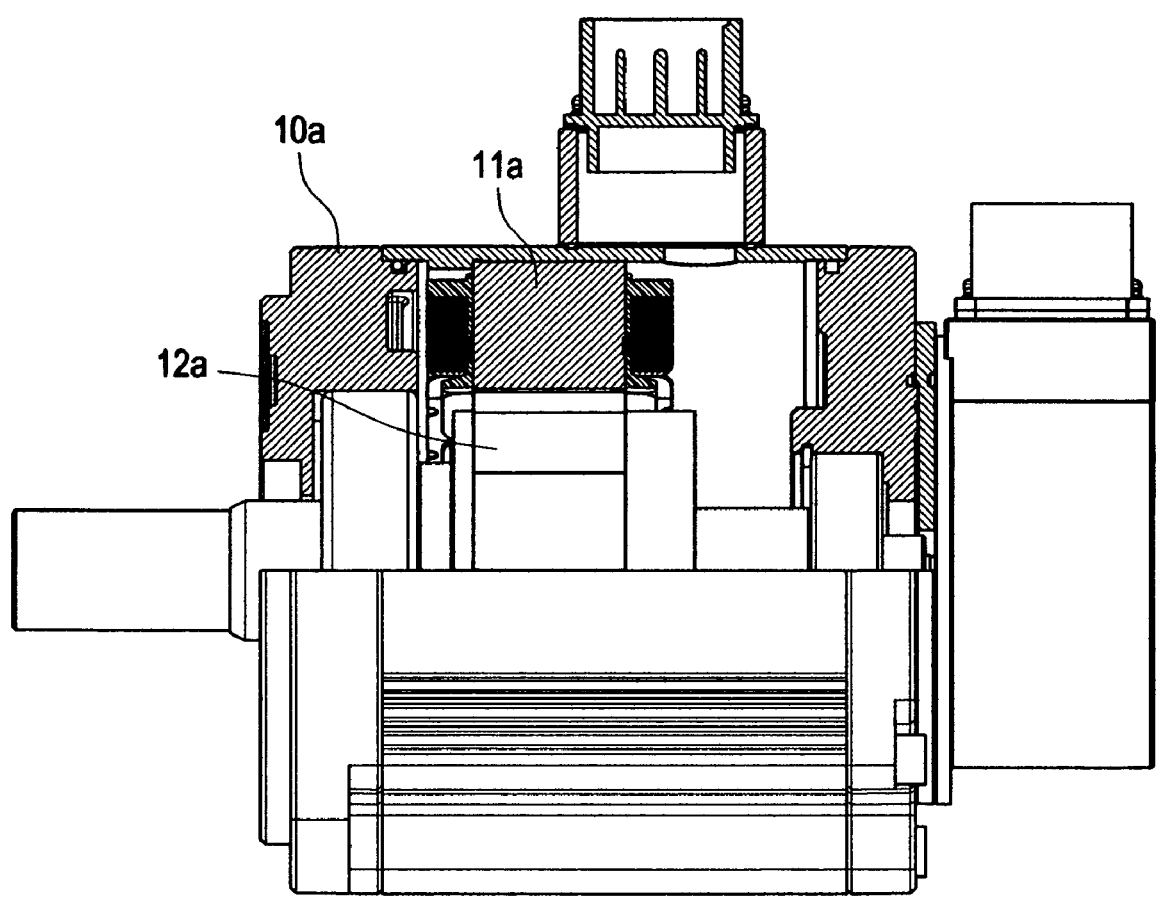
FIG. 1A shows a sectional view of a prior art motor.
Figure 1B:
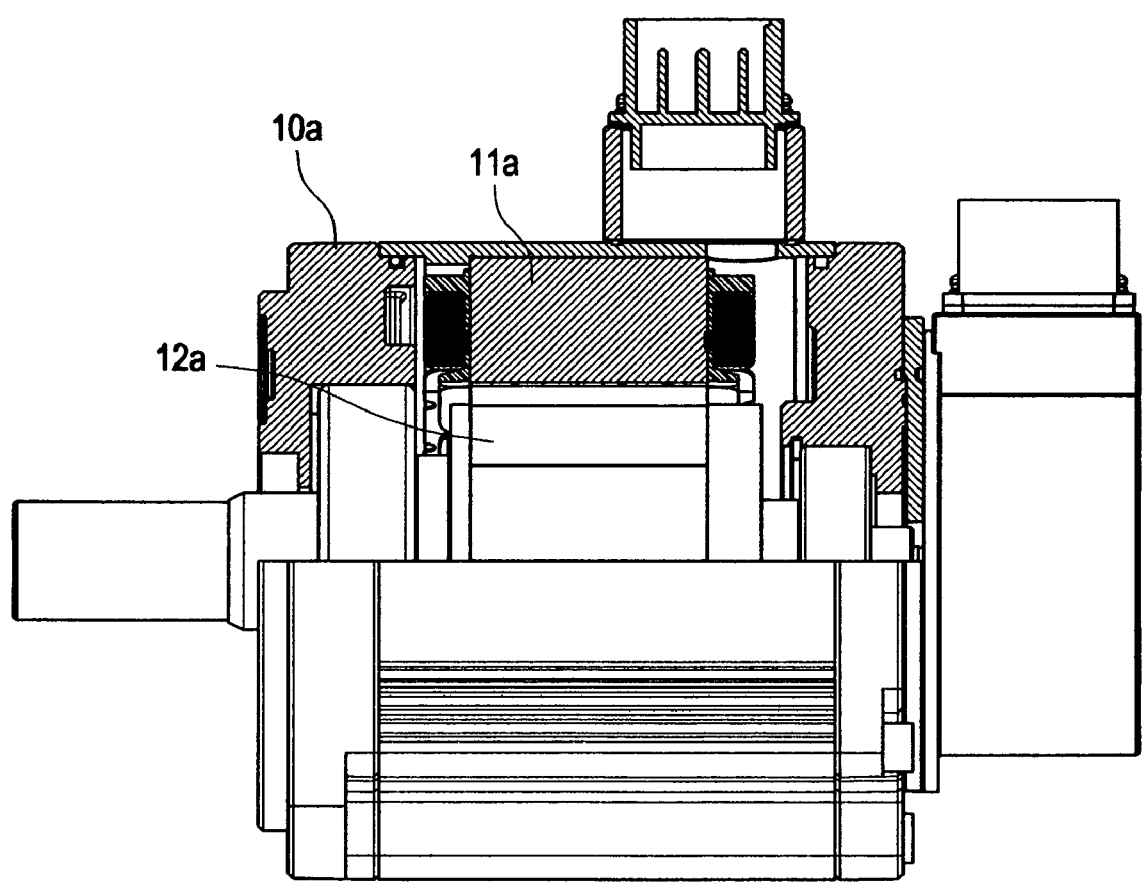
FIG. 1B shows a sectional view of the prior art motor in FIG. 1A after improvement.
Figure 2A:
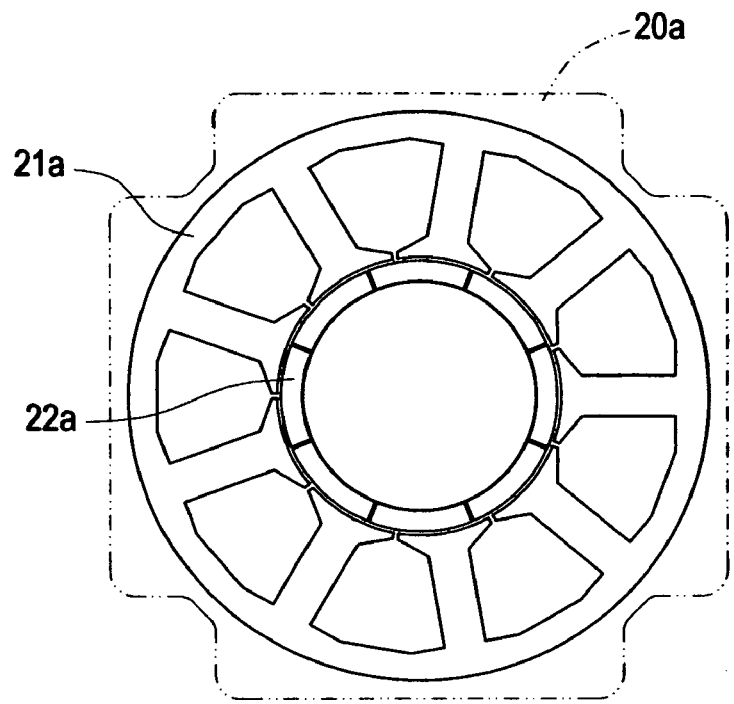
FIG. 2A shows a sectional view of another prior art motor.
Figure 2B:
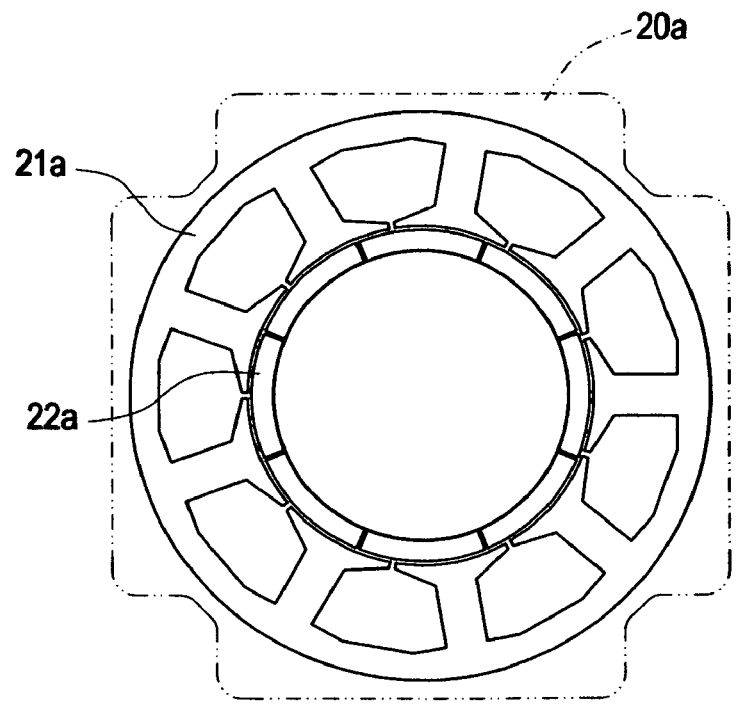
FIG. 2B shows a sectional view of the prior art motor in FIG. 2A after improvement.
Figure 3:
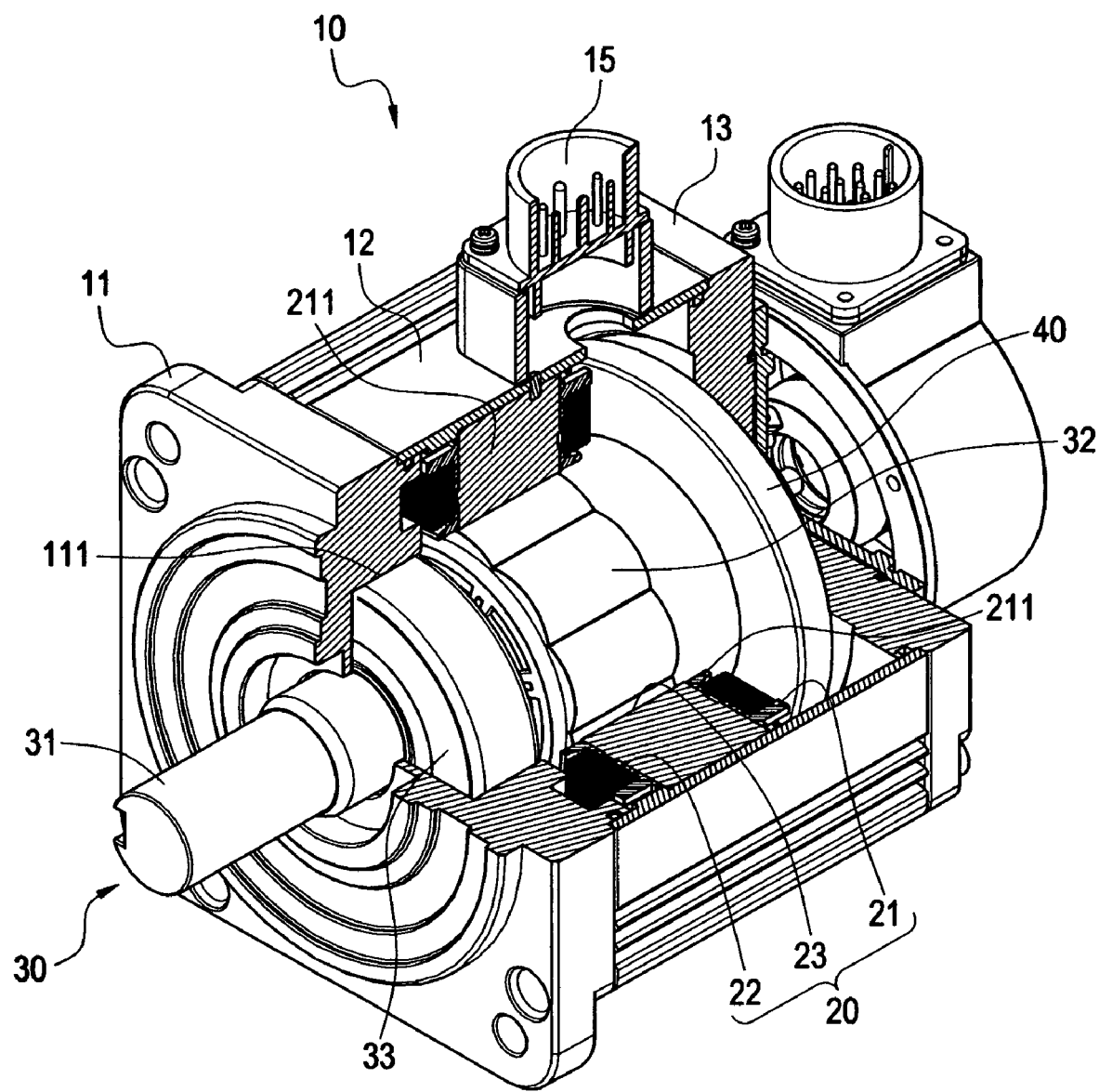
FIG. 3 shows the perspective view of servo motor according to a preferred embodiment of the present invention.
Figure 4:
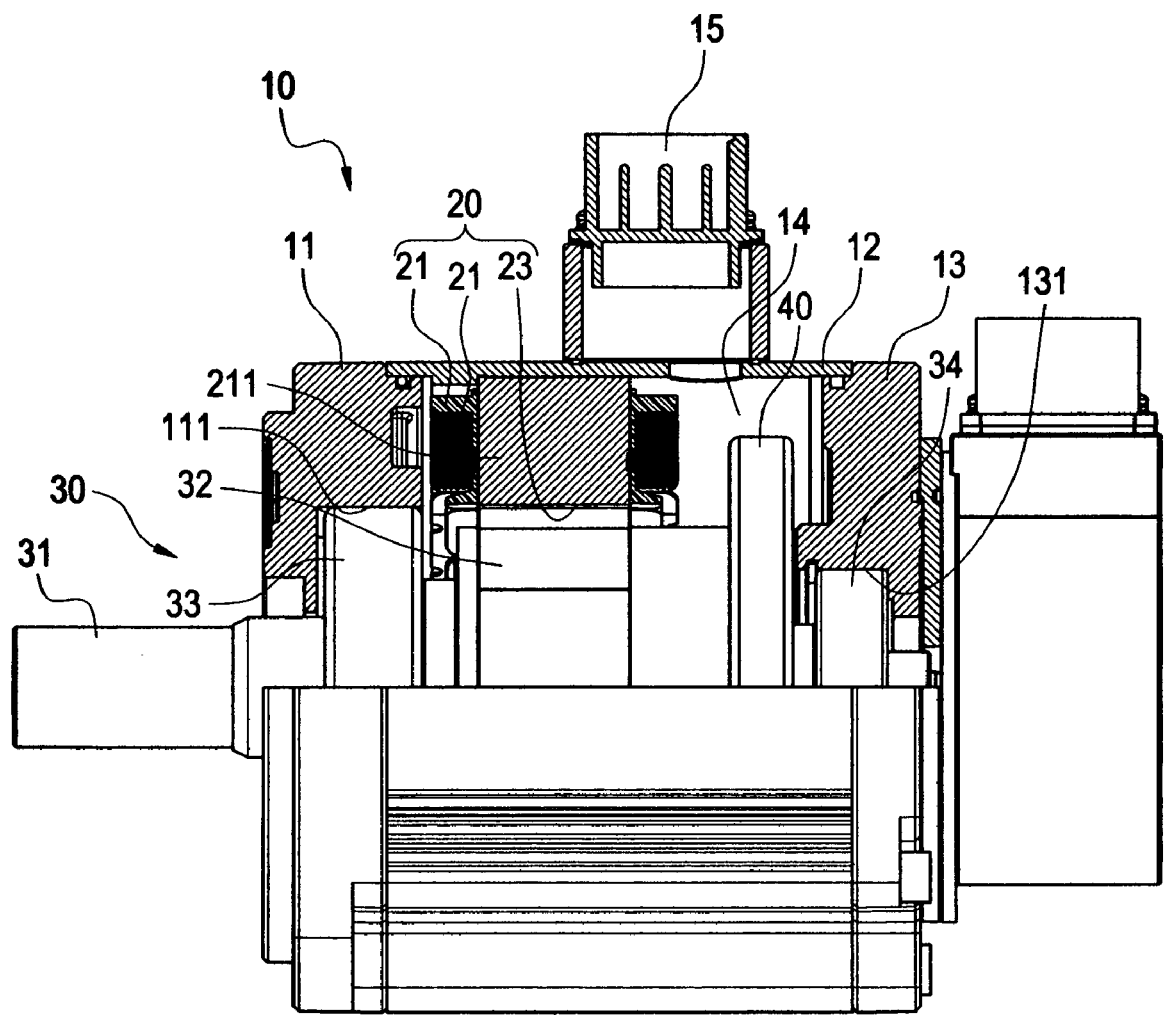
FIG. 4 is a front view of the servo motor in FIG. 3.

With reference to FIGS. 3 and 4, the present invention provides a servo motor with high inertia. The servo motor mainly comprises a casing 10, a stator 20, a rotor 30 and an inertia disk 40.

The casing 10 comprises a front shell 11, a cylindrical middle shell 12 connected to rear side of the front shell 11, and a rear shell 13 connected to rear side of the middle shell 12. A closed and hollow accommodating chamber 14 is defined within the front shell 11, the cylindrical middle shell 12 and the rear shell 13. As shown in FIG. 4, axial stages 111 and 131 are formed on center of the front shell 11 and the rear shell 13 and opposite to each other. Moreover, terminal stage 15 is connected to topside of the middle shell 12 for the connection of external power cord.

The stator 20 is arranged in the accommodating chamber 14 of the casing 10 and directly fixed to inner wall of the middle shell 12. The stator 20 comprises a ring 21 and a plurality of silicon steel plates 211 extended inward from inner side of the ring 21. Each of the silicon steel plates 211 is wound with coil 22 and a through hole 23 is defined at center of the ring 21.

The stator 30 comprises a rotation shaft 31 and a magnetic body 32 capped to center of the rotation shaft 31. Bearings 33 and 34 are capped to front end and rear end of the rotation shaft 31 and fixed in the axial stages 111 and 131 such that the magnetic body 32 is within the through hole 23 of the stator 20.

The inertia disk 40 is a round disk and can be fixed to the rotation shaft 31 of the rotor 30 through pin or key. According to a preferred embodiment of the present invention, the inertia disk 40 is fixed in the casing 10 and at rear side of the stator 20. After the coil 22 of the stator is magnetized, the rotor is rotated and the inertia disk 40 is also rotated to increase the rotational inertia of the rotor 30. Moreover, the rotor inertia is proportional to the rotor density and the fourth power of the rotor radius. Therefore, inertia disks 40 with different radius and thickness can be provided to a motor with the same output power. During rotation of the rotor 30, the rotor 30 is added with different inertia provided by different inertia disk 40. The amount of inertia increment depends on the inertia required to match with load.

Figure 5:
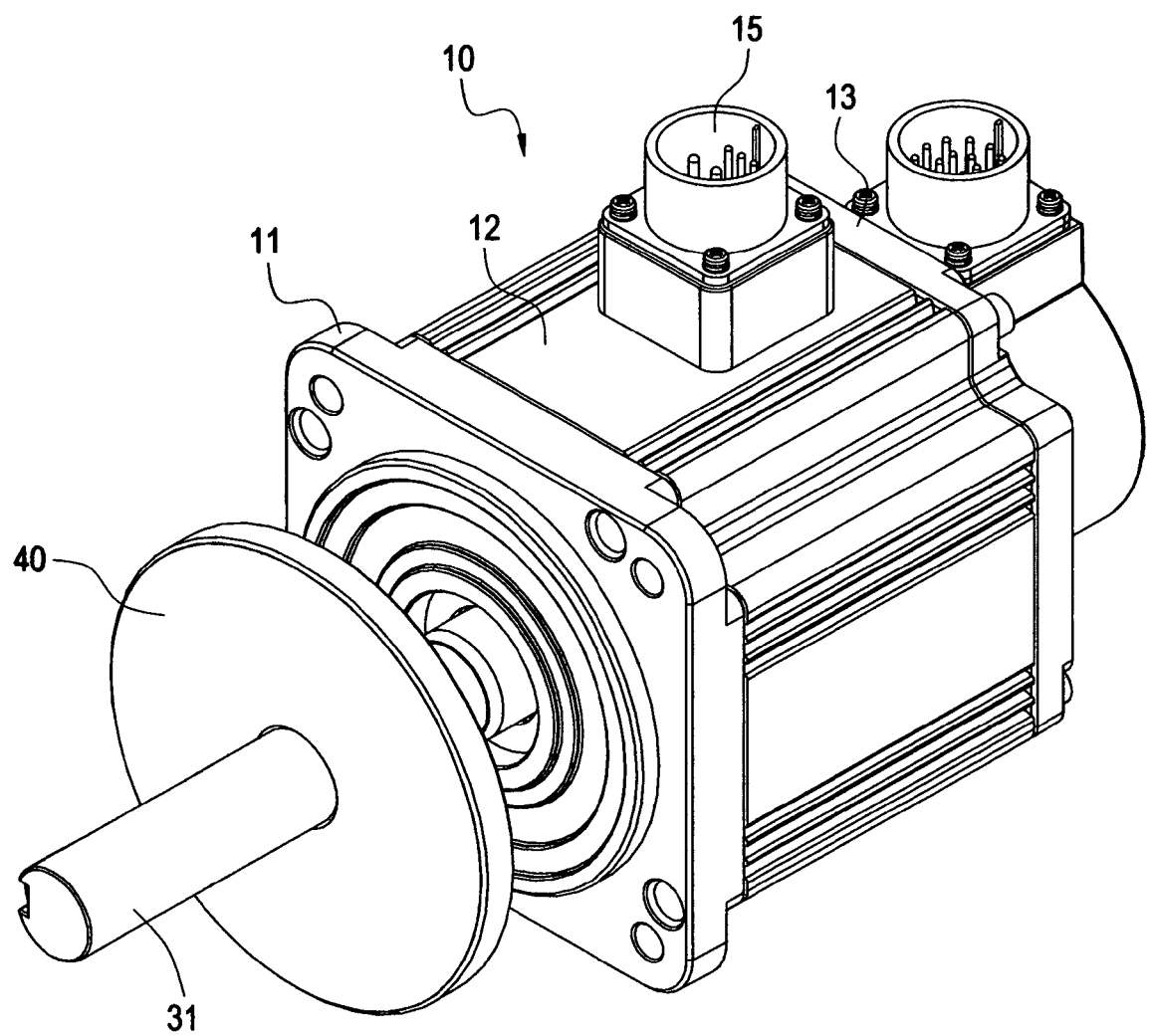
FIG. 5 shows the perspective view of servo motor according to another preferred embodiment of the present invention.

FIG. 5 is a perspective view according to another preferred embodiment of the present invention. The inertia disk 40 can also be arranged outside the casing 10 and fixed to the rotation shaft 31 of the rotor 30. Therefore the rotor inertia can be increased without changing the size of the casing 10 or changing the molding die of the stator 20.

The servo motor with high inertia according to the present invention has following advantages. The inertia disks 40 can be arranged within the casing 10 and beside the stator 20, therefore, the outer diameter of the inertia disks 40 is not limited by the inner diameter of the through hole 23 of the stator 20. Moreover, the rotation inertia of the rotor 30 can be increased according to practical need. The cost of molding die for the motor is reduced because the molding die for the stator 20 of various sizes is not needed for matching various rotation inertias. Moreover, the outer diameter of the inertia disk 40 can be larger than the inner diameter of the through hole 23. The inertia disk 40 of small mass and large inertia is possible (namely, inertia disks 40 with large radius and thin thickness). The load for the bearings 33 and 34 are reduced and the life of the bearings 33 and 34 can be prolonged.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A servo motor with large rotor inertia, comprising:
    a casing comprising a hollow chamber and axial stages at front side and rear side thereof;
    a stator arranged in the chamber and comprising a ring and a plurality of coils around the ring, a through hole being defined at the center of the ring;
    a rotor comprising a rotation shaft and a magnetic body capped to the rotation shaft, wherein both ends of the rotation shaft are fixed to the axial stages such that the magnetic body is arranged in the through hole, an end of the rotation shaft extending out of the casing for connecting with a load; and
    only an inertia disk directly fixed to the rotation shaft of the rotor, wherein the inertia disk is located at another end of the rotation shaft, the inertia disk, being rotatable dependently with respect to the rotation shaft, is rotated to increase rotation inertia of the rotor when the stator is magnetized to rotate the rotor, as such the inertia disk with different radius and thickness can be provided to the server motor with same output power and an amount of inertia increment provided by the inertia disk depends on inertia required to match with the load.

2. The servo motor with large rotor inertia as in claim 1, wherein the casing comprises a front shell, a middle shell connected to rear side of the front shell, and a rear shell connected to rear side of the middle shell; wherein the hollow chamber is a closed space defined within the front shell, the middle shell and the rear shell.

3. The servo motor with large rotor inertia as in claim 1, wherein the axial stages are formed at centers of the front shell and the rear shell.

4. The servo motor with large rotor inertia as in claim 1, wherein a plurality of silicon steel plates are extended inward from inner side of the ring, wherein each of the silicon steel plates is wound with coil and the through hole is defined on inner side of the silicon steel plate.

5. The servo motor with large rotor inertia as in claim 1, wherein the rotor further comprises two bearings capped to the rotation shaft and the rotation shaft is fixed to the axial stages through the bearings.

6. The servo motor with large rotor inertia as in claim 1, wherein the inertia disk is arranged in the casing and beside the stator.

7. The servo motor with large rotor inertia as in claim 1, wherein the inertia disk is arranged outside the casing.

* * * * *